Aug. 20, 1946.　　　　J. P. CORCORAN　　　　2,406,136
ANTIBUCKLING DEVICE FOR FILM FEEDING MECHANISMS
Filed April 17, 1944
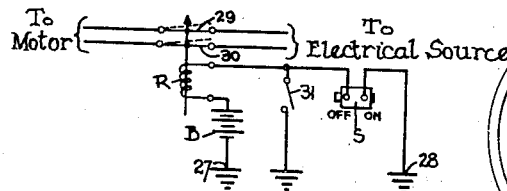
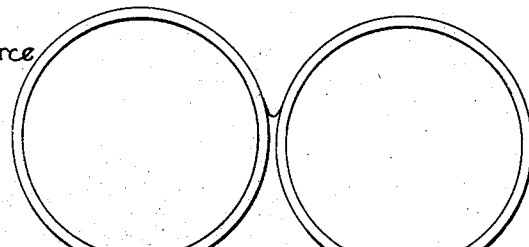
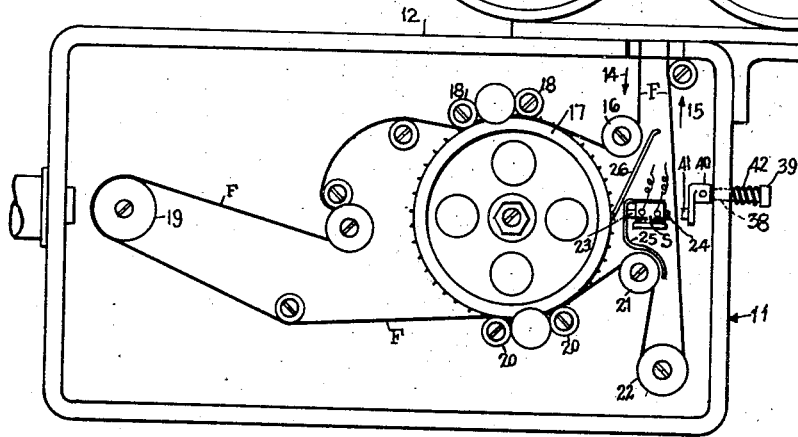
Fig. 1.
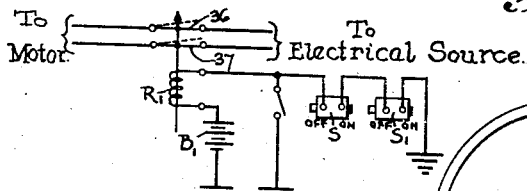
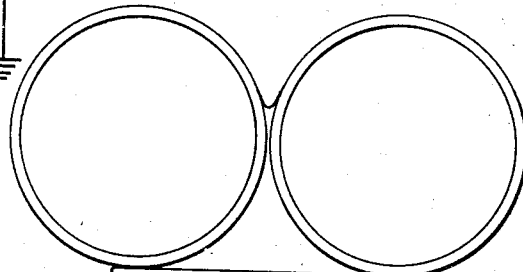
Fig. 3.
INVENTOR
James P. Corcoran
BY
ATTORNEY Patented Aug. 20, 1946

2,406,136

UNITED STATES PATENT OFFICE 2,406,136

ANTIBUCKLING DEVICE FOR FILM FEEDING MECHANISMS

James Patrick Corcoran, West Los Angeles, Calif., assignor to Twentieth Century-Fox Film Corporation, Los Angeles, Calif., a corporation of New York Application April 17, 1944, Serial No. 531,510

2 Claims. (Cl. 200—52)

This invention relates to the cinetechnical art and deals particularly with a means for preventing buckling in motion picture film while being run through cameras or the like.

The invention to be described hereinafter has been developed in connection with a sound camera which is more commonly called in the art a sound recorder. However, as the description proceeds it will become apparent to cine-technicians that the means disclosed will operate equally as well in cameras which take pictures, or in projectors, or in any type of apparatus where the film is moved through the machine by mechanisms.

The chief object of this invention is to provide a device which automatically operates to stop the film moving mechanism in a camera whenever the film does not follow its usual path through the camera. In sound cameras it has been the experience of operators that the take-up spool which draws the film out of the camera into the magazine sometimes will fail to take up the film sufficiently fast to clear it from the take-off sprocket in the camera or will fail to take the film away altogether, thus allowing it to accumulate in the camera. Since the operator has no way of immediately knowing when this occurs, it sometimes happens that the film will pile up in the camera to such an extent that it will pack between the sprockets and rollers and strain the bearings. At times it has been known to actually damage bearings, rollers, and casings.

To prevent the above, I conceived of an arrangement whereby the film, upon leaving its regular path in the camera, would trip a switch which in turn would actuate attendant mechanism to shut off the power to the motor which drives the machine. The location of the switch becomes important in view of the fact that most of the trouble occurs at the take-off sprocket in the camera, due to failure of the take-up spool in the magazine. Since this was the point where the film was most apt to buckle, I decided to place my device at this particular point so as to eliminate any trouble from this source. I also realize that there are other points in the film travel that need attention. Therefore, in the drawing and description it will be found that I have shown and illustrated more than one place in which my device may be applied. Other objects and advantages will become apparent as the description proceeds in conjunction with the drawing in which:

Figure 1 is a fragmentary view of a sound recorder, with the front door removed, showing how my device would be installed therein;

Figure 2 is a schematic view of an electrical circuit which may be used with the device as it is shown in Figure 1;

Figure 3 is a view of a different type of sound recorder showing the application of two of my devices; and Figure 4 is a schematic diagram showing the electrical circuit which may be used in conjunction with the device shown in Figure 3.

Briefly stated, my invention may be broadly stated to comprise a toggle type switch having push buttons for opening and closing the switch, together with means for mounting the switch in the camera along the path of travel of the film so that the film will operate a member which actuates the switch whenever the film leaves its normal path of travel. In other words, if the film magazine take-up fails to operate, the film necessarily will accumulate in the camera compartment and will be forced to leave its normal path of travel therein. My device is so set and arranged that as soon as the film does leave its accustomed path it engages a member which in turn operates the switch. The result is that the power is shut off to the motor and the whole machine stops immediately. In practice, this has been found to substantially eliminate all film packing in cameras.

Referring more specifically to the drawing, it will be seen in Figure 1 that I have installed my arrangement in a sound camera generally designated 11. The camera comprises a conventional light-tight case 12 having a door which closes the same but which is not shown in this view. Mounted upon the case 12 is a film magazine generally designated 13 which feeds film into and out of the camera case 12. As shown in this view, the film F enters the magazine at 9 and leaves the magazine at 10 and flows through the camera in the direction of the arrows 14 and 15. Between 9 and 10 the film moves in its customary path over guide roller 16, feed sprocket 17, where it is clamped in position by clamping rollers 18, and from there in its usual path over the stabilizing recording drum 19. From the drum 19 the film follows back to the sprocket 17 and is clamped on the lower side of the sprocket 17 by clamp rollers 20. From here it passes over guide rollers 21 and 22, from which point it passes out of the case at the point 10. Since the feed sprocket 17 is the driven member of the mechanism and is geared to the film, it can readily be seen that if the film should fail to be removed from the magazine at the point 10 it would accumulate around the rollers 21 and 22. The roller 21, being nearest to the sprocket 17 which feeds the film, has been used as the particular roller with which I associate my device. As will be noted here, my device comprises a switch generally designated S. The switch is of the toggle type with push buttons 23 and 24, which are for the purpose of putting the switch in an "on" and "off" position. In this case the button 23 puts the switch in an "off" position, while the button 24 puts it in the reverse, or "on" position. Pivotally mounted upon the switch S is a depending member 25 which is shaped to fit the circumference of the roller 21 and hangs in a position close to the roller. The purpose of this member 25 is to engage the film F if it leaves the roller 21 to any extent and, if the film presses the member 25 sufficiently so as to move it slightly, it will in turn press the button 23 which will throw the switch S into an "off" position and shut off the motor that drives the machine.

Another way in which the switch may be actuated would be for the film F to cling to the teeth on the sprocket wheel 17 and ride up into the space between the member 25 and the periphery of the wheel. To prevent the film from riding past the switch and into the upper part of the sprocket where it would become jammed with the incoming film, I provide a stripper plate 26 which is arranged to strip the film from the face of the sprocket wheel and force it against the member 25. The result is that if any film ever follows the sprocket wheel up to this point, it is forced against the member 25 and the switch may be actuated in this manner.

In Figure 2, I have shown how the switch operates to shut down the motor which drives the camera. Here it can be seen that the switch S is installed in a circuit comprising a battery B and a relay switch R. The circuit comprising the battery, the relay, and the switch S is grounded as shown at 27 and 28. However, in place of the two grounds I may use a conductor circuit if desired. The relay switch R operates contactors 29 and 30 which constitutes a switch placed in the conductors between the source of electrical supply and a motor (not shown) which operates the camera. As a precautionary measure, I may incorporate a manually operated switch 31 which would be for the purpose of closing the circuit through the relay switch R so that the motor may be disconnected by hand as well as by automatic means in the camera. The foregoing description deals with a single installation of my device for preventing film buckling at a specific point in the camera.

In Figure 3, I have shown how my idea may be embodied in a different type of sound recorder. Here it will be observed that I have incorporated a switch S which is identical with the switch described hereinabove and have also incorporated a second switch SI. The path of the film FI through this arrangement is obvious. It passes over a sprocket 32 in identically the same manner as it passed over the sprocket 17 in Figure 1. The position of the switch S in this arrangement is also identical with that shown in Figure 1. However, in this view there is another feed sprocket 33 which introduces another possibility of film breaking and being wrapped around the sprocket wheel 33, thereby causing damage at this point. To prevent this possibility, I mounted a second switch SI close to the sprocket wheel 33 and fixed a spring finger 34 on the switch so that the finger engages a button 35 which operates the switch SI and extends to a position close to the face of the wheel of the sprocket. Under this set-up it would be impossible for film to wrap around the sprocket wheel 33 between the finger and the face of the wheel without pressing the finger 34 and actuating the switch SI, which would in turn operate the relay switch to disconnect the motor from the source of electrical supply.

The electrical circuit for operating the two switches is shown in Figure 4. Here it can be seen that the switches S and SI are in series in the circuit embodying a battery BI and a relay switch RI. In this case the switches SI and S2 being in series, the relay RI must hold contactors 36 and 37 in a closed position when the switches are closed. I am aware that there are other ways of doing this; for instance, the relay switch RI could be in a closed position when deenergized, in which case the switches S and SI could be paralleled and could be actuated into a closed position by the film.

A device of the above nature has been found to eliminate all film buckling due to failure of magazine take-ups or any other deviation of the path of the film through cameras.

In practice it has been found to be desirable, in view of certain precautions which have to be used in machines of this type, to use a push button toggle switch. This type of switch has two positions, an "on" and "off" position, which remain fixed until changed. Accordingly, since it is possible for the switch to be in the wrong position at times, it is necessary to provide means whereby the operator could assure himself that the switch was in the proper position before the machine was started. For this purpose I provide an external arrangement for setting the switch in the proper position for running. The means for this purpose is best shown and illustrated in Figure 1. Here it will be seen that I have mounted a rod 38 in the wall of the casing 12. The rod 38 is formed on the outer end with a head 39 and carries on the inner end a member 40 which is fixed thereto in any suitable manner. The member 40 is provided with an arm that carries a button 41 arranged to engage the button 24 when the rod 38 is pushed inwardly. A spring 42 normally keeps the rod extended externally so that the film F passes freely between the buttons 24 and 41. Under this arrangement the operator, before starting the machine, assures himself that the switch S is in the proper position by pressing the knob 39. This precaution is necessary since the switch S may inadvertently be moved into the improper position when threading the machine. With this device the door to the recorder may be closed and the switch reset at any time thereafter. In Figure 3, I have shown the same arrangement with respect to switch S but have left the switch SI open for resetting by hand. In this case the switch SI is in the open so that it can be seen by eye and can be manually reset.

I claim:

1. In a power driven machine for handling motion picture film or the like, a feed sprocket for passing film through said machine, a switch for controlling the power for said machine near said feed sprocket, and a stripper plate associated with said feed sprocket arranged to strip film from said feed sprocket when said film leaves its customary path with respect to said feed sprocket and force the stripped film to operate said switch.

2. In a machine for handling motion picture film or the like, power driven means for passing film through said machine, said means including a feed sprocket and a guide roller, a switch for controlling said power driven means having a movable member extending near said roller adapted to be engaged by film leaving the roller to operate said switch, and a stripper plate arranged to strip film from said feed sprocket and force the stripped film to engage said movable member and operate said switch when the film leaves its customary path with respect to said feed sprocket.

JAMES PATRICK CORCORAN.